Aug. 6, 1935. A. RUTTIMAN 2,010,201
VALVE AND OPERATING MECHANISM THEREFOR
Filed Jan. 12, 1933 2 Sheets-Sheet 1

NORMAL FLOW

CLOSED

FLOODING

Inventor:
Alfred Ruttiman,
By Spear, Donaldson & Hall
Attorneys.

Aug. 6, 1935.  A. RUTTIMAN  2,010,201
VALVE AND OPERATING MECHANISM THEREFOR
Filed Jan. 12, 1933  2 Sheets-Sheet 2
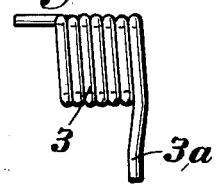
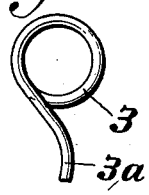
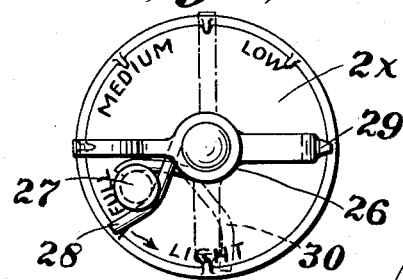
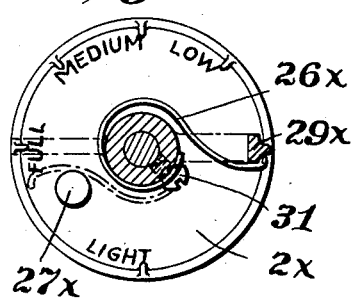
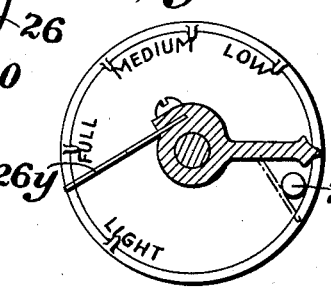
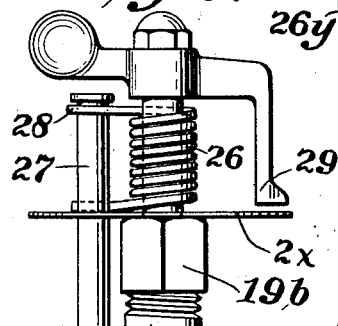
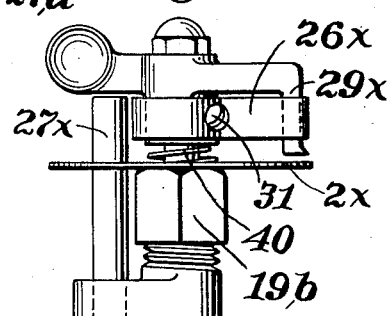
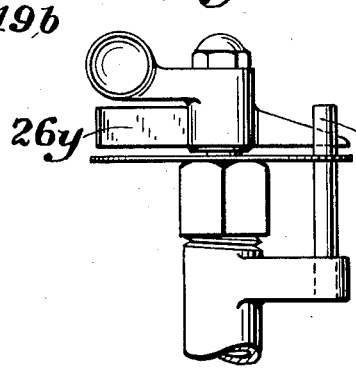
Inventor:
Alfred Ruttiman,
By Spear, Donaldson & Hall
Attorneys.

Patented Aug. 6, 1935

2,010,201

UNITED STATES PATENT OFFICE 2,010,201

VALVE AND OPERATING MECHANISM THEREFOR

Alfred Ruttiman, Gardner, Mass., assignor to Florence Stove Company, Boston, Mass., a corporation of Massachusetts Application January 12, 1933, Serial No. 651,421

8 Claims. (Cl. 251—141)

In general this improvement relates to an automatic means of reducing the flow of fluid to a predetermined amount from a larger flow rate. In particular it relates to the control of the flow of oil to oil burning devices. We find a desirable application of this device in the class of burners known as range burners. In a burner of this class oil is vaporized by heat from a substantially cup like bowl. Said vapor rises between the annular perforated channels whereby it is mixed with air and combustion takes place. The vaporizing bowl is normally heated by conduction and radiation from the burner parts. To start the heating process, however, asbestos wicks are placed in the bowl, and the oil is admitted to saturate them, after which they may be ignited with a match in the usual way to start the combustion process. Once the bowl becomes heated this excess liquid oil admitted evaporates until only oil vapor is being formed and fed to the flame.

It is desirable during this initial process to allow the oil to flow in rapidly to quickly fill the bowl and saturate the lighting rings. This flow rate is many times in excess to that desired for full flame operation, and if such flow rate were continued, a high, smoky flame would result. The present practice is to reduce the flow manually by means of the ordinary type needle point shut-off valve, or similar rotating stem type shut-off valve. There are various means of controlling the flow of oil on such valves, such as by a tapered needle point, slotted stem, barrel valves, etc., which are well known to the art, and specifically form no part of this invention. In all such, regardless of the actual means of varying the flow, the stem must be rotated manually. At times the operator will forget to reduce the flow after the lighting period with the resulting smoky fire described above.

The particular object of this invention is to provide a means for automatically reducing the flow from that required for starting to that required for normal, full flame, or similar predetermined flow.

In the accompanying drawings

Fig. 6 is a side view and Fig. 6a is an end view of a spring.

Fig. 7 is a vertical sectional view of the dial member of Figs. 1 and 5.

Fig. 8 is a side view, and Fig. 8a a plan view of a modified form of the invention.

Fig. 9 is a side view and Fig. 9a a plan view partly in section of another form of the invention.

Fig. 10 is a side view, and Fig. 10a a plan view partly in section of a further form of the invention.

Figure 1B:
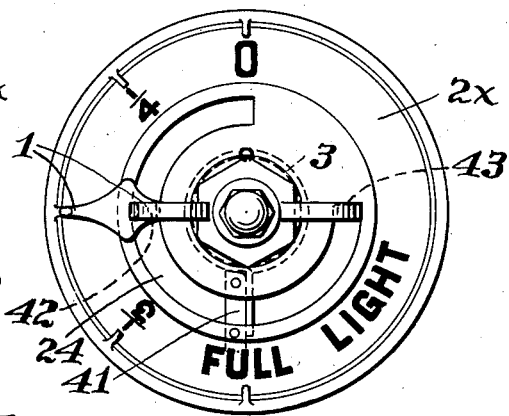
Figs. 1a and 1b show a modification.
Figure 1:
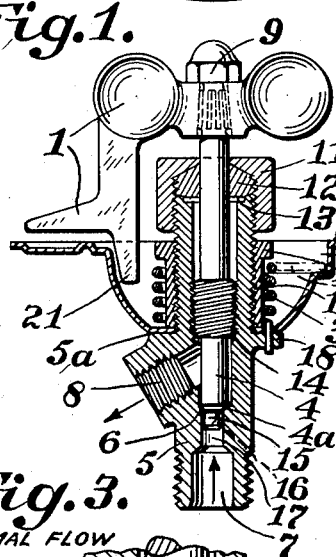
Figure 1 is a vertical sectional view of the preferred form of the invention, parts being shown in elevation.

Referring to Fig. 1, 5 is the valve body having a valve seat 6 through which the liquid enters the system from the port 7 connected with the supply or tank by any suitable pipe or conduit, for which purpose the lower end of the body is externally screw threaded.

Figure 2:
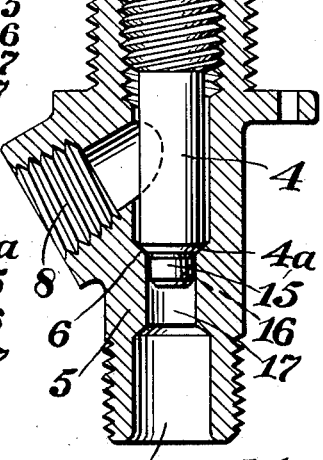
Fig. 2 is a detail view of the valve in closed position.

The oil flows out from the valve body to the burner through the port 8 and any suitable pipe screw threaded thereinto. At 4 is shown the valve stem, the lower end of which is adapted to shut off the supply of oil when resting on the seat 6 as in Fig. 2, or when the valve stem is partly raised, as in Fig. 3 oil may flow past the lower end 4a of said valve stem and to the burner, through port 8 in such prescribed limited amount as will produce a normal flame at the burner, and when raised to its upper limit the valve 4a will, as shown in Fig. 4, allow flow of oil to the burner in such greater amount as will flood the burner and permit lighting to be accomplished.

The valve stem 4 has a pointer 1 rigidly attached thereto by a nut 9. A stuffing box is shown at 11 having packing 12 and a washer 13. The stem is provided with a triple thread 14 by which on turning the stem by grasping the pointer 1, the lower end of the said stem will be adjusted in relation to the valve seat to cut off the flow, or regulate the flow for normal burning or for lighting the burner. The lower end of the valve stem then is a pilot portion 15 in which is formed a groove 16 for the passage of the oil when the valve is lifted to such an extent as will expose this groove above the valve seat. When the valve is closed its conical shoulder 4a rests upon the conical seat and flow of oil is entirely cut off.

Figure 3:
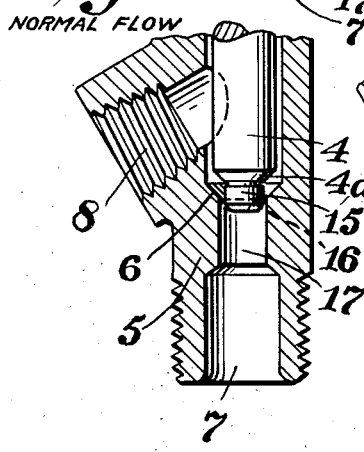
Fig. 3 shows the position of the valve for reducing the flow of oil for producing a normal flame at the burner.
Figure 4:
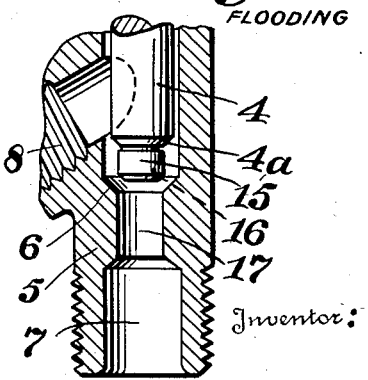
Fig. 4 shows the position of the valve for increasing the flow of oil to the burner for flooding the same in order that the burner may be lighted readily and quickly.

When the valve is regulated for normal flow to provide a normal flame, the pilot portion 15 is still located within the bore 17 of the valve body, see Fig. 3. When rapid flow of oil past the valve is desired, for flooding the burner for lighting, then the pilot portion preferably occupies a position entirely out of the bore 17 and above the seat 6.

Figure 5:
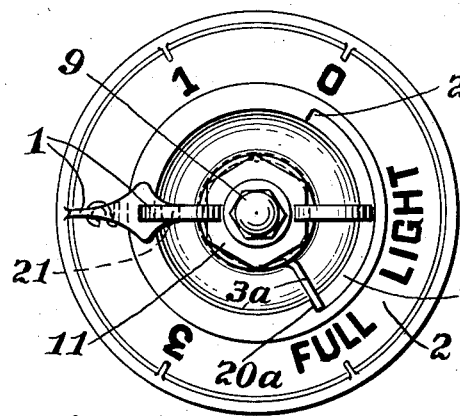
Fig. 5 is a plan view of Fig. 1.

The valve body 5 has a shoulder 5a, and a nut 19 is screw threaded upon the exterior of the body above this shoulder. The nut has an upper flange 19a between which and the shoulder 5a of the body a spiral spring 3 is located. This spring is preferably normally under slight tension. One end is fixed to the valve body for which purpose said end enters an opening 18 in the shoulder or flange of said body. The upper or rather the other end of said spring normally bears upon the end wall 20a of a recess 20 in a dial member 2. This dial member is of general cup formation as shown in Fig. 1, its central portion having an opening therein through which the valve body 5 extends upwardly and at its upper edge the dial member has a horizontal annular portion 2a which bears the dial marks as shown in Fig. 5, such as 0, 1, 2, 3, "Full" and "Light". This dial is held in place by the nut 19 which engages the central cup shaped portion thereof. The upper end 3a of the spring lies in the path of the downwardly extending projection 21 of the pointer 1. The pointer can swing from the position 0 to the various positions 1, 2, 3 and "Full" without being resisted by or subjected to the operable stress of the spring 3 and thus a range is established through the stations just mentioned for normal operation of the burner from "out" condition to "Full" flame for normal burning. In this range of adjustment the pointer can be freely moved back and forth between the points "0" and "Full". If, however, the pointer is turned past the station "Full", its depending finger 21 will pick up the radially extending upper end 3a of the spring and will carry this along with it and thus wind up the coil spring as the pointer is moving from the "Full" to the "Light" position, see Fig. 5. This places the pointer under tension of the spring 3. When the pointer reaches the station marked "light" the oil bowl at the burner will have been flooded to a sufficient extent to enable lighting of the burner to be accomplished readily. This having been done, the pointer 1 is released from the grip of the operator's hand and the pointer is now returned automatically to a position within the range of normal and safe burning, and within this range the pointer may be freely adjusted to regulate the flame or put it out if desired.

When the pointer 1 is set at "Light" on the dial the pilot valve 4a will be fully opened so that a rapid flow of oil will take place past the valve to the oil bowl. The pointer having been returned to the range between 0 and "Full", the valve may be adjusted freely to open the pilot valve more or less for different heights of flame as may be desired. By the use of the return spring 3 it will be impossible for the valve to be accidentally left in position for flooding the burner because as soon as the user releases the handle member, which in the present illustration is the pointer, the valve will be automatically restored to the range of normal burning.

The invention may assume different forms. Thus in Fig. 1a the spring 3 is located below a dial plate 2x which is of flat form held by a nut 19x against a shoulder 5x of the valve body. The pointer has a downward extension passing through a slot 24 in the dial plate.

In both forms described the valve stem has a movement in the direction of its axis in opening and closing the valve. The major portion of this axial movement of the valve takes place when the pointer is free from contact with or pressure from the spring. That is to say, from station 0 to stations 1, 2, 3 and "Full" Fig. 5, which is considerably more than one half the circuit of the dial, the pointer is not influenced by the spring and the valve will freely move axially throughout the range from station 0 to station "Full".

In Figs. 8, 8a is shown a spring 26 coiled about the upper end of the valve stem, one end of this spring bearing upon one side of the post 27, and the other end 28 of this spring bearing upon the opposite side of said post, and extending in a substantially radial direction out beyond this post so that when the pointer or handle member is moved from the position for full flame into the zone for lighting, the lower end of the arm 29 of the pointer will come against the spring end 28, and thereby said pointer or handle member will be placed under the tension of said spring so that when, after the lighting action has been performed, the hand of the operator has been withdrawn from the pointer or handle, the said pointer or handle will be returned to the full flame position where it will be free from said spring tension, and where the valve will have been adjusted in the direction of its axis into a position for supplying the prescribed quantity of oil for maintaining the flame at normal burning.

At 30 in Fig. 8a the position of the end of spring 28 is indicated in dotted lines, this being the position for flooding the burner for lighting. The coil spring 26 serves to hold the dial 2x down in place against the nut 19b.

In the form shown in Figs. 9, 9a, a flat spring 26x is employed instead of a wire coil spring, one end of said flat spring being mounted on the hub of the pointer or handle member by a screw 31. The other end of this flat spring bears upon the depending arm 29x of the pointer. This spring turns freely with the handle or pointer throughout the circuit for normal burning or the adjustment thereof, but when the pointer is turned beyond the full flame position, the spring 26x will come against a post 27x, and from that point on in an anti-clockwise direction, the spring 26x will be tensioned, and this tension will be transmitted to the hub of the pointer tending to return the pointer to the normal burning position. This return action will take place as soon as the operator's hand is removed from the pointer or handle member.

In this rotary return of the valve stem its screw threaded action with the wall of the valve body will adjust the said valve in the direction of its axis to the position for normal burning or variations within the normal burning zone, according to the particular set that the operator may give the pointer or handle member for varying the flame.

In this form also a spring 40 is employed for holding the dial member 2x in place, this spring being interposed between the hub of the pointer or handle member and a nut 19b at the top of the valve body.

In Figs. 10 and 10a a flat spring arm member 26y is secured at one end to the hub of the pointer, its other end being free, and if the pointer is turned to a position beyond that for normal burning, the spring 26y engages a post 27a, and from then on the pointer, together with the valve stem, will be placed under tension of this spring, so that as soon as the operator removes his hand from the pointer, the valve stem will be turned, and the valve will travel in the direction of its axis back to the position for normal burning, or adjustment within the range of normal burning.

Stop means are provided to prevent overthrow of the parts in turning the pointer or handle for flooding the burner. This may assume various forms. One form is shown in Figs. 1 and 5 in which the recess or space 20 of the dial in which the end 3a of the spring 3 swings has a stop shoulder 20x at one end thereof against which the end of the spring comes to be stopped thereby. This also acts as a stop for the pointer or handle 1 because said handle bears on the end of the spring and can be turned no further when the end of the spring hits the said shoulder 20x.

A stop of this general character for arresting the pointer to prevent overthrow may be embodied in the other forms of the mechanism, and in any case the purpose is to prevent overthrow of the pointer or handle beyond a safe flooding condition for lighting, protects the spring from being overturned and overstressed, and prevents the threads of the valve stem from being damaged.

In all the forms the hub of the pointer has a finger or arm reaching out beyond the hub portion to engage the spring and in some of the forms this finger depends from the main part of the pointer to swing around the axis of the valve at a considerable distance therefrom, and from the hub of the pointer. This enables a spring of considerable extent to be used, and secures considerable leverage in the operation of the spring and valve.

The organization is self contained in the sense that the dial, the spring, the valve stem and pointer are all carried by a valve body such as 5, having its end screw threaded to be attached to the stove organization as one body.

The spring for returning the valve is under normal stress when in normal position.

The invention is not limited to use with range burners nor to burners using oil nor to any particular form of valve nor to valve means of the rotary type, the scope of the invention being defined by the accompanying claims.

Figure 1A:
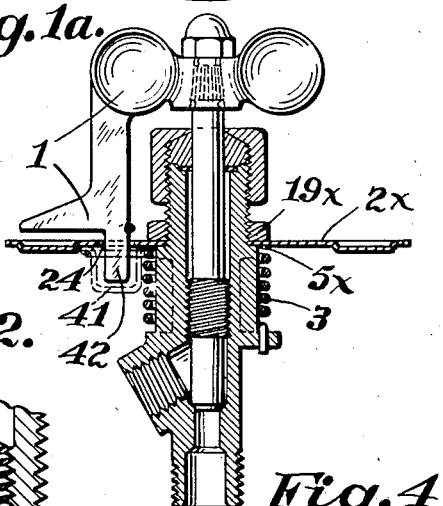

Reverting to the form of the invention shown in Fig. 1a: one end of spring 3 extends into the path of the said downward extension of the pointer where it passes through the slot. This end of the spring rests upon a bridge piece 41 riveted to the dial plate and projecting below the same. This bridge piece will allow the extension 42 of the pointer to pass by it and pick up the end of the spring when said pointer passes the normal "Full" position and gets within the lighting zone. The limit of this movement is determined by the end wall 43 of the slot acting as a stop to the further movement of the pointer extension. When the pointer is released, the spring will return it to a position within the range for normal burning and the spring will then have its end resting against the bridge piece ready to be picked up again.

I claim:

1. In a valve mechanism for oil stoves of the class described, a valve body, a valve in said body having a rotary stem, a coil spring surrounding the rotary stem and having one end affixed to the valve body, a dial carried by the valve body and having two stop means between which the other end of the spring has permissive movement, and contact means carried by the stem for picking up said other spring end after opening the valve a predetermined degree and carrying said other spring end from one stop means to the other while subjecting the valve to restorative stress.

2. In a valve structure for oil stoves having an inlet passageway and an outlet passageway, a valve controlling flow of oil between said passageways, said valve opening communication between said passageways through a range permitting flow of oil up to a maximum normal capacity limit and also to a greater degree permitting an excessive flow of oil to the outlet passageway, a spring for yieldingly restraining the opening of the valve at the upper limit of the normal range and imposing stress on the valve when opened to the greater degree for excessive flow, said stress serving to restore the valve to the normal capacity range, one end of said spring being fixed to the valve structure and the other end being free to move, and a dial and pointer associated with the valve to indicate its setting, said dial also having a slot therein providing stop shoulders arresting movement of the free end of the spring at the upper and lower limits of the range for excessive flow.

3. In a valve structure for oil stoves having an inlet passageway and an outlet passageway, valve controlling flow of oil between said passageways, said valve opening communication between said passageways through a range permitting flow of oil up to a maximum normal capacity limit and also to a greater degree permitting an excessive flow of oil to the outlet passageway, a spring for yieldingly restraining the opening of the valve at the upper limit of the normal range and imposing stress on the valve when opened to the greater degree for excessive flow, said stress serving to restore the valve to the normal capacity range, one end of said spring being fixed to the valve structure and the other end being free to move, and a dial and pointer associated with the valve to indicate its setting, said dial having a cup shaped portion receiving said spring and also a nut clamping the dial against the valve structure, said cup shaped portion also providing stops limiting the path of movement of the free end of the spring.

4. In a valve structure for oil stoves having an inlet passageway and an outlet passageway, a valve controlling flow of oil between said passageways, said valve opening communication between said passageways through a range permitting flow of oil up to a maximum normal capacity limit and also to a greater degree permitting an excessive flow of oil to the outlet passageway, a spring for yieldingly restraining the opening of the valve at the upper limit of the normal range and imposing stress on the valve when opened to the greater degree for excessive flow, said stress serving to restore the valve to the normal capacity range, said valve being provided with a stem, said spring being of helical shape and encircling the stem, and a post carried by the valve structure against the opposite sides of which the ends of the spring normally bear.

5. In combination in a valved structure, a valve controlling the flow of oil, a stem for said valve, a casing for the valve having therein a valve seat with a port controlled by said valve, a spring inactive during the opening or closing of said valve and during the movement of said valve within a range in which the flow is restricted for supplying oil for normal consumption, a contact for stressing said spring, a handle for operating the valve stem for moving the valve from fully closed position through said range of normal oil supply and also through an additional range in which there is a relatively unrestricted flow for supplying additional oil in excess of that which can be normally consumed and also for moving the valve to its fully closed position, one of said elements, spring or contact, being mounted on one of said parts, stem or valve casing, and the other of said elements being mounted on the other of said parts, said spring and contact being spaced apart during the movement of the valve from fully closed position through the normal oil supply range whereby the valve will remain in any set position and being in engagement only during the movement of the valve through the additional range for supplying oil in excess quantities to stress the spring for returning the valve from the additional supply range to only normal oil supply range when the handle is released, the movement of the valve to fully closed position being dependent on the manual operation of said handle.

6. In combination in a valved structure having only a single passageway therethrough, a valve controlling flow of a fluid through said single passageway, said single passageway being openable by said valve through a normal range in which there is a restricted flow of oil up to a maximum capacity limit and also opening communication through a greater range in which there is a relatively unrestricted flow of oil through the single passageway for supplying oil in excess of that which can be normally consumed, a manually operable element for opening the valve for the flow of fluid within the range of normal capacity and to the greater degree of opening for excessive flow, a spring member and a contact member for stressing the spring normally spaced apart but brought together for stressing said spring and said valve only when the latter is moved to an open position greater than that for the normal capacity, said valve being restored by said spring only to the normal capacity range when the manually operable element is released and said valve being free of stress from said spring in the normal capacity range whereby it will remain in any set position, a casing for the valve, a stem for the valve mounted in the casing, one of said members being mounted on the casing and the other of said members being movable with the valve stem, substantially as described.

7. In a valve structure for oil stoves having an inlet passageway and an outlet passageway, a valve controlling flow of oil between said passageways, said valve opening communication between said passageways through a normal range in which there is a restricted flow of oil up to a maximum normal consumption limit and also opening communication through a greater range in which there is a relatively unrestricted flow of oil to the outlet passageway for supplying oil in excess of that which can be normally consumed, and a spring for yieldingly restraining the opening of the valve at the upper limit of the normal range, said spring being inactive upon the valve throughout the normal range whereby said valve will remain in any position to which it is set but imposing stress on the valve when opened to the greater range in which there is an excessive flow, said stress serving to restore the valve to the normal capacity range.

8. A valve structure according to claim 36 in which said valve has a rotary stem and a contact member carried by the stem, and said spring encircles the stem and has one end fixed and the other end disposed in the path of arcuate movement of the contact member.

ALFRED RUTTIMAN.